Patented Feb. 25, 1941

2,233,033

UNITED STATES PATENT OFFICE 2,233,033

PROCESS OF TREATING COFFEE

Floyd W. Robison, Detroit, Mich.

No Drawing. Application May 1, 1939,
Serial No. 271,133

2 Claims. (Cl. 99—63)

This invention pertains particularly to the processing of green, raw or unroasted coffee, and has for its primary object to extend its field of consumption to possible caffein-sensitive individuals, through the removal of the caffein, and to possible physiologically susceptible individuals through the removal of the free acids, as well as to improve the appearance of the green, raw or unroasted coffee and bring about a greater solubility of the otherwise insoluble constituents through the action of microorganisms. More particularly the invention pertains to a processing procedure developed upon a foundation of green, raw or unroasted coffee with the following objects:

First, the extension of the application of microorganisms to coffee to include the results of the action of the enzymes of the mold which has been artificially grown upon the coffee for the purpose of implanting upon that coffee not only a new and improved flavor through the action of the microorganisms but, as well, the development of a greatly increased solubility of the otherwise insoluble constituents through the direct action of the enzymes of that particular mold.

Second, to extend the field of the consumption of the beverage to caffein sensitive individuals and to physiologically susceptible individuals by (a) Removal of the caffein.
(b) Removal of the excess free tannic acids.
(c) Improvement of flavor through the action of microorganisms growing upon these caffeinless and acidless coffees, and particularly that type of microorganisms known as molds and, more specifically, that type of molds known as *Aspergillus ochraceous*.
(d) Development of increased solubility of the otherwise insoluble constituents through the development and activity of the enzymes elaborated during the life action of the mold.

A further purpose of this invention is to produce, through the means described for the removal of caffein and excess free acids, a new article having a greatly enhanced old-crop coffee flavor and a decidedly wholesome, nontoxic beverage of high quality and universal acceptability when roasted and subsequently brewed, which has been elaborated entirely upon a real coffee foundation and is a product other than coffee only in the respect that it has had its caffein removed and its excess free tannic acids removed and, but for these effects, would be otherwise considered to be a truly genuine coffee.

Coordinated with and subsequent to the development of my improvements in the treatment of coffee, as described in my Patent No. 1,313,209, dated August 12, 1919, and as a result of careful research and through study physiologically and hygienically of the very popular beverage coffee, I have observed and determined:

First, there is a large group of individuals who may be called caffein-sensitive. This group includes those persons who perhaps have already developed a heart condition which indicates the desirability of discontinuing the use of any food or beverage containing caffein, and children, who by common consent are not considered suitable persons for coffee drinking. The medical fraternity universally has condemned coffee and tea drinking for children, and adults with heart irregularities.

Second, a very large group of individuals who are not caffein-sensitive at all, but are, nevertheless, susceptible to digestive disturbance caused by drinking coffee. I have been able to trace this effect to be the result of coffee with an overreaching or an overbalanced content of free acids. By free acids I do not refer to the free fatty acids or the volatile fat acids of the butyric type, which are associated with rancidity, since these latter, while promoters of undesirable or rancid flavors, are not and cannot be considered unwholesome as they are so quickly utilized in the body metabolism that they are in reality quite harmless. In point of fact, they are really foods. What I do refer to are the undesirable tannic acids.

With either of the groups cited, coffee drinking is undesirable, and ordinarily avoided, but, since coffee has become so common a commodity, great effort has been made to provide coffee substitutes or to remove this or that objectionable feature, resulting in the marketing of a class of so-called decaffeinated coffees and so-called detannated coffees, each endeavoring to satisfy one particular group of individuals. The result has been to increase the susceptibility of that group to the overbalanced condition to which the other group is sensitive, through the removal of the one particular constituent.

I have found, also, that in no instance has there been religious adherence to the removal of either caffein or tannic acids and, as a consequence, the net result has been a coffee thrown tremendously out of balance and in most instances made in reality much less wholesome by the various treatments.

To better understand the purposes of my present invention, it should be borne in mind that caffein, chemically, is a product known as trimethyl xanthine. Its base is really xanthine, a base not at all lacking in compatibility with regular human metabolic processes. Caffein is what may be called a feeble base and as such will combine with certain acids to form unstable salts. The so-called tannic acids as a group do combine lightly with caffein. Now, in general, in raw, green coffee these tannic acids are in a proportion approximately two to one with caffein.

In mellow, very old-crop coffees, the relationship is more balanced and we find a normal condition wherein the caffein and free tannic acids are present in approximately equal proportions.

In the raw, green coffee, the greatly preponderant tannic acids as compared to caffein make certain that that coffee is very acid or sour, and it thus becomes a health hazard, hygienically speaking, while still containing caffein which makes impossible its use among caffein-sensitives.

In the case of old-crop mellow coffee, the tannic acids are balanced with caffein and present no digestive problem but the caffein still acts as a barrier to the caffein-sensitive.

To remove the caffein from either of the above coffees leaves the free tannic acids sufficiently preponderant to encourage digestive disturbances, thus extending this hazard to the caffein-sensitive persons who otherwise might be encouraged in its use because of assurance that the caffein has been removed.

Thus, without going more deeply into the physiological reasons than to show this system to be developed from a sound, scientific foundation, what I propose is as follows:

I first treat the green, raw, unroasted coffee by opening the sacks and emptying the coffee upon suitable trays to a depth of preferably not exceeding four inches, and in a manner which permits of ready air or vapor exchange in an autoclave. Practically any steam-jacketed autoclave will serve the purpose, but one with a door opening horizontally and having a track and carrier for the trays is especially desirable. The live steam is then turned on in the autoclave and the coffee beans are permitted to absorb moisture, while the temperature is rising, until a pressure of approximately ten pounds steam is created inside the autoclave. During this process of heating, the steam is allowed to freely circulate through the coffee and thru a drain to atmosphere and, by the time the pressure has reached ten pounds, usually about one hour, a large portion of whatever excess free acids are present will have distilled away. The steam is next shut off, the valves opened to permit a subsidence of pressure to atmosphere, and the coffee is withdrawn and allowed to cool to approximately room temperature, after which it is placed in a revolving screen tumbler and immersed in a solvent or otherwise effectively subjected to the action of a solvent such, for instance, as benzol or methyl dichloride, etc. Any suitable solvent that acts largely on the caffein alone will serve this purpose. The coffee is kept in the solvent preferably under constant agitation until tests show the caffein to have been removed.

After thus removing the caffein, the solvent is withdrawn for recovery thereof as well as collection of the caffein, and the coffee replaced on the trays and again placed in the autoclave, where it is again subjected to the live steam treatment as before. The circulating steam this time is passed through a condenser having a trap for collection of any remaining solvent, and the pressure of approximately ten pounds maintained until the steam at the outlet comes free from the solvent and has developed a clean, sweet, nutty flavor, showing removal of all excess acids.

The coffee is now without caffein and without the undesirable tannic acids, and the process whereby it is rendered free of these constituents has placed the coffee in a soft, moist and highly sterile condition especially desirable for the further processing which is necessary in order that it may be brewed after roasting to produce a body comparable with that of ordinary coffee of every day use. It must be appreciated that in thus removing both caffein and free acids, subsequent roasting and brewing would result in a very thin, undesirable product, for nothing has been done to replace those constituents which have been removed.

I have found that, in this state, the coffee is especially well prepared for treatment by microorganisms in the manner set forth in my above patent and that such treatment may be carried out with especial effectiveness, not only on account of the extremely sterile condition, but by reason of previous removal of the caffein and acids and for this reason, as soon as the coffee is removed and cools, it is treated with a culture of a specific organism or organisms as, for instance, *Aspergillus ochraceous* by spraying the suspended culture on the coffee or in any other suitable manner. After such treatment, the coffee is preferably placed in wooden trays which are stacked one upon another and conveyed to any suitable incubator or humidor in which a constant temperature is maintained and where it is subjected to a constant high degree of water saturation approximating 100%.

The coffee after about three to four days will have developed a very noticeable growth of the microorganisms and after this has reached the optimum point, or in about one week, the coffee is transferred to a bin where, in a mass of the coffee, a very desirable enzymic action, that is, mold enzyme, takes place, with the result of greatly increasing its solubility, high developing its flavor, and removing the last traces of effects of previous treatment and developing characteristics of smoothness or mellowness found otherwise only in fine, old-crop coffees.

The coffee preferably remains in mass storage from one week to ten days and is then removed and very carefully dried in any suitable manner, as by the use of steam, down to the original moisture content. It is then ready for roasting or, if desired, may be resacked and held as is other coffee for subsequent roasting and will be found to have taken on the appearance and cup characteristics of fine, old-crop coffees. By thus first removing the caffein and free tannic acids I render the coffee in a condition in which treatment by microorganisms, and particularly that type of microorganisms known as molds and more specifically that strain of molds known as *Aspergillus ochraceous*, is particularly efficient for the purpose of greatly improving the flavor and, especially through the action of the mold enzymes, for greatly increasing the solubility of those portions of the coffee previously substantially insoluble which will thereby replace the body producing qualities of the caffein and acid constituents previously removed in the treatment.

What is claimed is:

1. The herein described process of treating coffee which comprises first moistening raw green coffee and subjecting the same to the action of live steam at a pressure of approximately ten pounds over a period of time sufficient to cause the coffee to swell and soften and release and expel excess free tannic acids, gradually releasing the pressure and permitting the coffee to cool to approximately room temperature, subjecting the cooled coffee to the action of a caffein solvent to remove caffein therefrom, subjecting the decaffeinized coffee to the action of live steam at approximately ten pounds pressure to drive off the residual solvent, permitting the coffee to cool, subjecting the coffee to a culture of *Aspergillus ochraceous* and thereafter maintaining a high degree of water saturation to develop a heavy growth of microorganisms of the mold type, transferring the coffee to a bin and allowing the same to remain therein en masse for approximately one week to permit enzymic action to take place by the mold type microorganisms thus developing the soluble constituents of any previously insoluble matter contained therein, and imparting to the mass an improved flavor, and finally stopping the enzymic action by drying the mass to the original moisture content thereof.

2. The herein described process of treating coffee which comprises first moistening raw green coffee and subjecting the same to the action of live steam over a period of time sufficient to cause the coffee to swell and soften and release and expel excess free tannic acids, permitting the coffee to cool to approximately room temperature, subjecting the cooled coffee to the action of a caffein solvent to remove caffein therefrom, subjecting the caffein-free coffee to the action of live steam to drive off the residual solvent, permitting the coffee to cool, subjecting the coffee to a culture of *Aspergillus ochraceous* and thereafter maintaining a high degree of water saturation to develop a heavy growth of microorganisms of the mold type, transferring the coffee to a bin and allowing the same to remain therein en masse to permit enzymic action to take place by the mold type microorganisms thus developing the soluble constituents of any previously insoluble matter contained therein, and imparting to the mass an improved flavor, and finally stopping the enzymic action by drying the mass to the original moisture content thereof.

FLOYD W. ROBISON.

CERTIFICATE OF CORRECTION.

Patent No. 2,233,033.  February 25, 1941.

FLOYD W. ROBISON.

It is hereby certified that error appears in the printed specification of the above numbered patent requiring correction as follows: Page 1, first column, line 2, for the words "or green" read --of green--; same page, second column, line 4, for "through" read --thorough--; and that the said Letters Patent should be read with this correction therein that the same may conform to the record of the case in the Patent Office.

Signed and sealed this 18th day of March, A. D. 1941.

(Seal)

Henry Van Arsdale,
Acting Commissioner of Patents.